(12) United States Patent
Broadus

(10) Patent No.: US 6,206,252 B1
(45) Date of Patent: Mar. 27, 2001

(54) LIQUID DISPENSING TAILGATE FOR AUTOMOTIVE VEHICLES

(76) Inventor: Brad Broadus, 22003 Blackwell Farm Rd., Saucier, MS (US) 39574

( * ) Notice: Subject to any disclaimer, the term of this patent is extended or adjusted under 35 U.S.C. 154(b) by 0 days.

(21) Appl. No.: 09/431,164

(22) Filed: Nov. 1, 1999

(51) Int. Cl.⁷ .................................................. A01C 35/00
(52) U.S. Cl. .......................... 222/608; 224/488; 224/495; 296/50; 296/57.1
(58) Field of Search ..................................... 222/608, 610, 222/185.1; 224/488, 495, 539; 296/37.1, 50, 57.1

(56) References Cited

U.S. PATENT DOCUMENTS

| 3,727,971 | 4/1973 | Sisler . | |
|---|---|---|---|
| 4,993,610 | 2/1991 | Abretske et al. . | |
| 5,207,469 | * 5/1993 | Rossi | 296/37.1 |
| 5,232,259 | * 8/1993 | Booker | 296/37.1 |
| 5,518,158 | 5/1996 | Matlack . | |
| 5,575,521 | 11/1996 | Speis . | |
| 5,687,895 | * 11/1997 | Allison et al. | 224/539 |
| 5,853,116 | 12/1998 | Schreiner . | |
| 5,876,086 | * 3/1999 | Lagrou et al. | 296/50 |
| 5,996,868 | * 12/1999 | Paradis | 224/539 |

* cited by examiner

Primary Examiner—Kevin Shaver
Assistant Examiner—Thach H Bui
(74) Attorney, Agent, or Firm—Dowell & Dowell, P.C.

(57) ABSTRACT

A tailgate for an automotive vehicle which defines an insulated liquid storage tank which includes a closeable inlet opening and a dispensing nozzle.

11 Claims, 2 Drawing Sheets

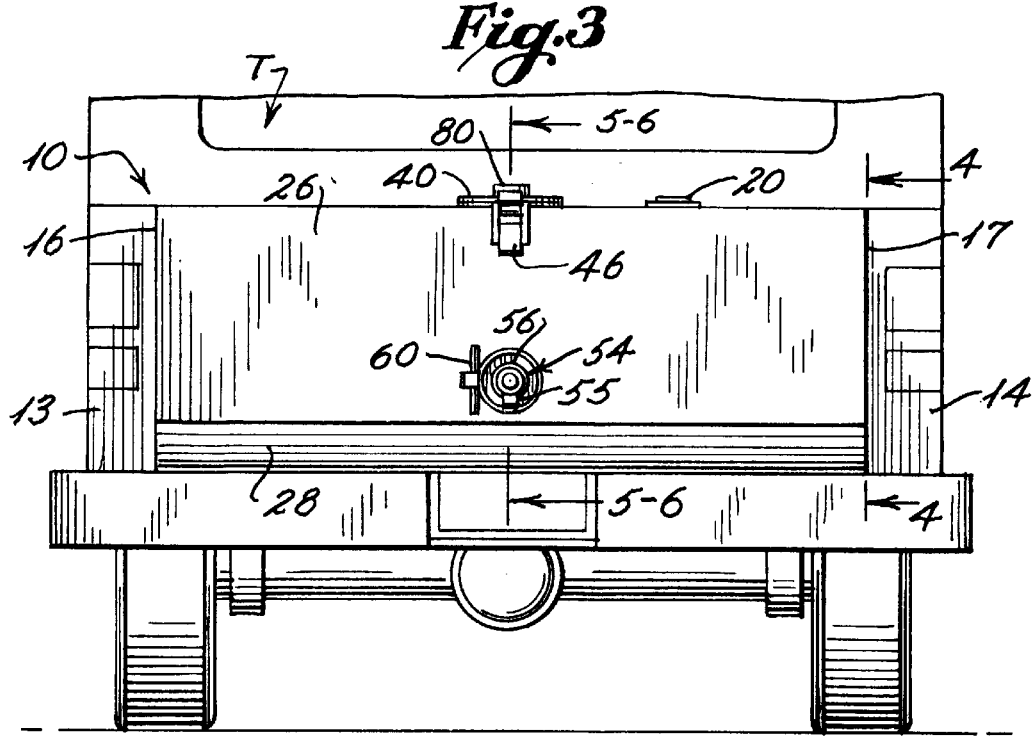
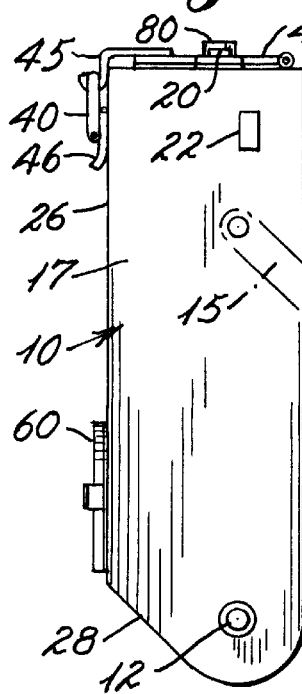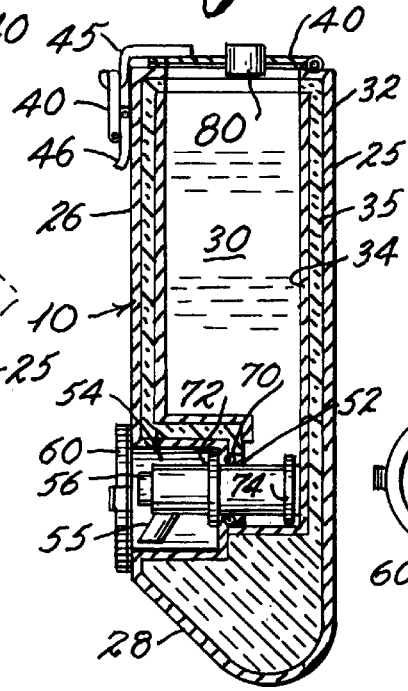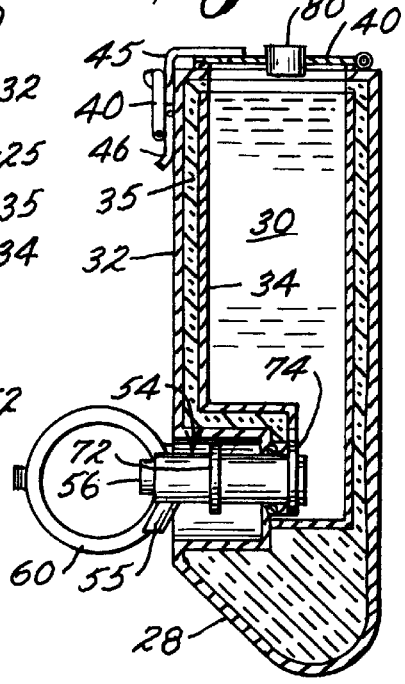

LIQUID DISPENSING TAILGATE FOR AUTOMOTIVE VEHICLES

BACKGROUND OF THE INVENTION

1. Field of the Invention

This invention is generally directed to the field of water coolers and dispensers used for dispensing water for drinking, cleaning, and the like and more particularly to a dispenser for water which is integrally formed with a tailgate of an automotive vehicle such that a potable source of water is readily available while conserving storage and seating space in the vehicle.

2. History of the Related Art

Water is a necessity of life and there have been numerous innovations directed to providing adequate sources of water wherever people live, work, play or travel. Because of the continuous need for water, portable water containers have been used throughout history to provide safe sources of potable water.

Due to difference between the chemical content of various sources of water, many people carry pre-bottled water when they travel for work or pleasure. By utilizing a known source of potable water, individuals can be assured of not only a safe supply of water but of a supply which is pleasing to the taste.

Because of modern technology and especially in the area of plastics and newly developed insulation materials, it is now possible to transport and maintain cool and potable water for not only periods of hours but for days. The only limitation with respect to a potable water supply is the ability to transport the water.

For individuals who backpack or hike, the amount of water which can be carried is limited to the weight that the individual can easily handle and, in most instances, such water supplies are relatively limited thus requiring preplanning to known when and where to obtain additional water.

Workers who are out in the field or are remote from a convenient and safe source of potable water must also be supplied with adequate drinking and cleaning water to maintain good health. Large coolers are frequently used on job sites. Depending upon the number of personnel, a plurality of coolers or containers must be transported to and from work sites. The transportation of large amounts of water requires storage space to be consumed in transport vehicles thus limiting the space for storage and transportation of other goods and personnel.

Similarly, people who attend various sporting or athletic events such as amateur sporting events where little or no potable water is available, must also transport water which is especially necessary for athletes. The transportation of such water requires a great deal physical effort.

People who travel great distances by automotive vehicles often travel in remote areas where the availability of potable water sources is unknown. In these instances, it is also a necessity that sufficient water coolers or containers be carried to provide a sufficient source of drinking water. Again, this requires physical effort to load water dispensers into a vehicle and also consumes storage and/or seating space within a vehicle.

In view of the foregoing, their remains a need to provide dispensers for both drinking and cleaning water which enable substantial quantities of water to be transported by vehicle without consuming storage space and which do not require physical effort to be exerted to load and transport the water.

SUMMARY OF INVENTION

The present invention is directed to a transportable source of potable water wherein a tailgate for use with a conventional automotive vehicle such as a truck, sport utility vehicle or station wagon includes a dispensing tank. The tank forms an integral part of the vehicle structure and thus does not require any storage or seating space to be consumed for the storage of water. The tailgate includes a fluid inlet through which water may be introduced into the storage or dispensing tank. A cover is provided for closing the inlet so as to prevent contamination of the tank. In the preferred embodiment, a latching mechanism is associated with the inlet cover and in some embodiments a lock may be provided for preventing unauthorized access to the tank.

The invention further includes a discharge or dispensing nozzle mounted through a wall of the tailgate which, in the preferred embodiment, is covered by a protective cover which is moveable between a covering position and an open position.

In one embodiment, the dispensing nozzle is designed to be recessed in an outer wall of a tailgate such that the nozzle does not protrude from the exterior surface of the tailgate. In a further embodiment, the nozzle may be moveable between a nondispensing position recessed with respect to the outer wall of the tailgate to a dispensing position exteriorly of the outer wall.

In accordance with a preferred embodiment of the invention, the side walls of the tailgate are defined by at least one outer shell and one inner shell with the inner shell being formed of a material which is compatible with the safe storage of potable liquid, such as stainless steel or plastic. An insulating layer is provided between the inner and outer shells for reducing the effect of ambient temperatures on the liquid with the tank.

It is a primary object of the present invention to provide a potable source of water for an automotive vehicle wherein a dispensing tank is formed as structural tailgate component of the vehicle thus allowing a substantial quantity of water to be safely stored for consumption without affecting storage or passenger space within the vehicle.

It is another object of the present invention to provide a potable source of water for an automotive vehicle which enables a substantial quantity of water to be easily transported so that sufficient water is available wherever the vehicle is located.

BRIEF DESCRIPTION OF THE DRAWINGS

FIG. 3 is a rear elevational view of the embodiment shown in FIG. 1;

FIG. 4 is a cross sectional view taken along line 4—4 of FIG. 3;

FIG. 5 is a cross sectional view taken along line 5—5 of FIG. 3 showing an embodiment with a recessed dispensing nozzle; and FIG. 6 is a cross sectional view taken along line 6—6 of FIG. 3 showing the dispensing nozzle being moved outwardly to permit dispensing exteriorly of the tailgate.

DESCRIPTION OF PREFERRED EMBODIMENT

Figure 1:
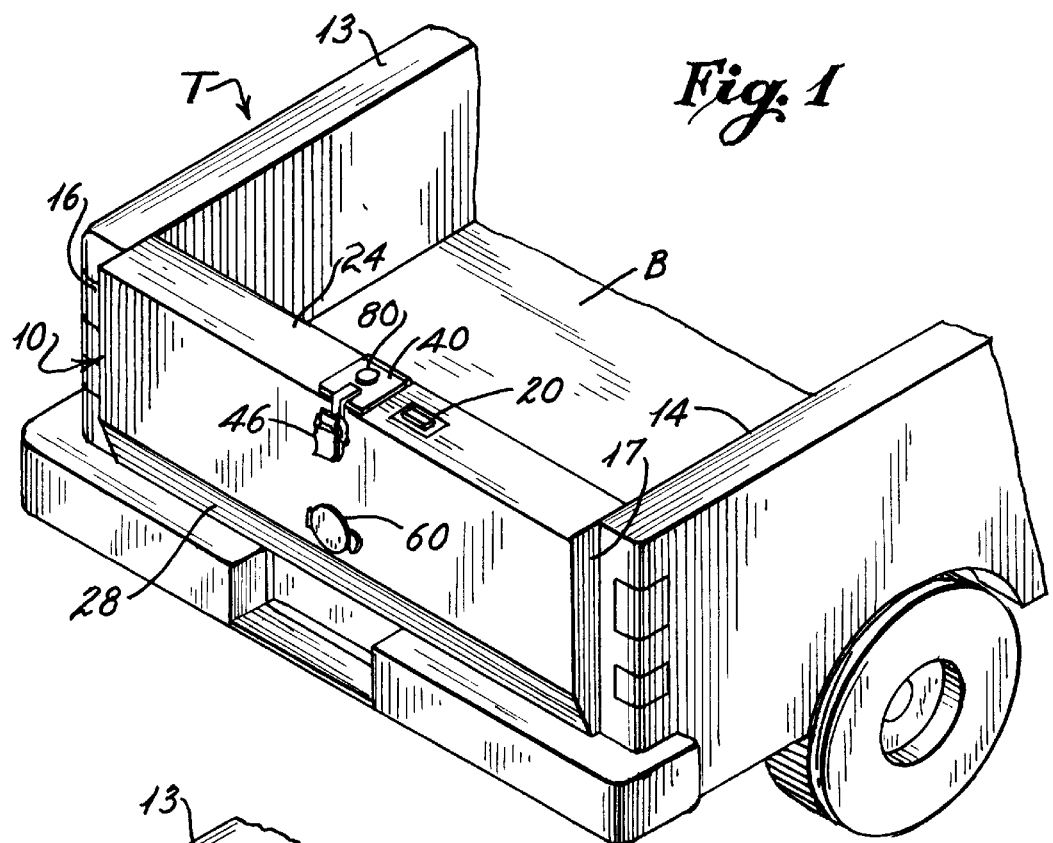
FIG. 1 is a partial rear perspective view of an automotive vehicle in the form of a pick-up truck incorporating a tailgate dispensing tank or container in accordance with the teachings of the present invention showing both the inlet and dispensing nozzle covered.
Figure 2:
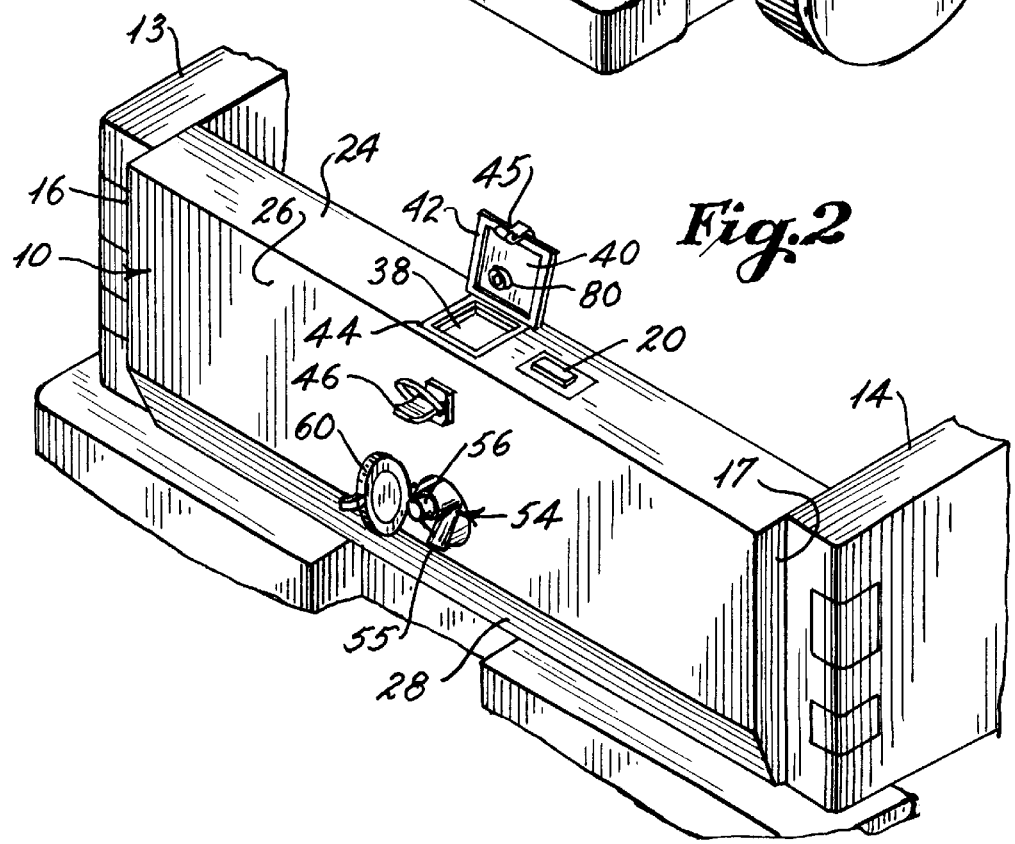
FIG. 2 is a view similar to FIG. 1 showing the cover for the inlet being opened to permit filling of the dispensing container of the tailgate of the present invention and with the cover for the dispensing nozzle being opened to permit dispensing.

With continued reference to the drawing figures, the liquid storage and dispensing tailgate 10 of the present invention will be described as it is used in place of a conventional tailgate associated with a pick-up truck "T". The embodiment shown is for example only and the tailgate of the present invention may be incorporated with substantially any automotive vehicle including all types of trucks, sport utility vehicles, station wagons, and other automotive vehicles incorporating a tailgate. The structure of the tailgate may be modified so as to permit retrofitting to replace any conventional tailgate regardless of make or model of automotive vehicle and thus the appearance of the dispensing tailgate of the present invention will vary depending upon the vehicle to which it is mounted.

As shown in FIG. 4, the tailgate is pivotally mounted in a conventional manner about shafts 12 to the opposite side walls 13 and 14 of the truck. Strut assemblies, such as shown in dotted line at 15, are provided on each of the side walls 16 and 17 of the tailgate for providing support when the tailgate is pivoted to an open or generally horizontal position with respect to the bed "B" of the truck.

To secure the tailgate 10 to the side walls 13 and 14 of the truck, a convention latch assembly including latch handle 20 are mounted within the tailgate. The latch assembly includes locking bars 22, see FIG. 4, which are movable into slots (not shown) in the opposite side wall 13 and 14 of the truck. Other latching mechanisms may be utilized within the teachings of the present invention.

The tailgate is shown as including a top wall 24, an interior or back wall 25, an exterior of front wall 26 and a bottom portion 28 which define therebetween a storage and dispensing tank or cavity 30, as shown in FIGS. 5 and 6.

The wall structure of the tailgate may vary depending upon different conditions and government standards and regulations with respect to the strength of the walls. However, the tailgate will be defined by at least an outer shell 32 which may consist of plurality of segments which are welded or otherwise secure to one other to form the exterior surface of the tailgate and an inner shell 34 which is formed of a biocompatible material which will allow water to be stored within the tank in a safe and potable condition. Generally, the inner shell or liner will be formed of a suitable molded plastic material which is impermeable to fluids so that the contents thereof are not adversely exposed to airborne contaminants and such that the contents will not leak from the tank. In some instances, a metallic material such as stainless steel may be utilized. In the preferred embodiment, at least one insulation layer 35 is provided between the inner and outer shell to thereby reduce the heat transfer brought about by ambient temperatures with respect to liquid being stored within the tank.

The liquid dispensing tailgate also includes an inlet 38 which is normally closed by a cover 40 having an outer seal 42 associated therewith which cooperates with a gasket or seal 44 surrounding the inlet opening. The cover 40 is normally retained in a closed position by a latch including components 45 and 46. To prevent unauthorized tampering with the storage container 30, a separate lock may be provided for preventing opening of the latch assembly 45 and 46 without having proper authorization. Although the inlet opening 38 is shown as being in the upper wall 24 of the tailgate, the inlet can be provided in another wall, such as a side wall, and remain within the teachings of the present invention.

In order to permit dispensing of liquid from the tank, a discharge opening 52 is provided through one of the side or end walls of the tailgate. In the embodiment shown in the drawing figures, the opening 52 is in the outer or front wall 26 of the tailgate and recessed with respect thereto. The opening need not be recessed and may be substantially flush with or extend from the wall of the tailgate.

In the embodiment shown, a dispensing nozzle 54 is mounted within the discharged opening 52. The nozzle 54 includes a discharge spout 55 which is opened by pushing a valve against a valve spring by operation of a push button 56 extending forwardly of the nozzle. Other configurations of dispensing nozzles may also be utilized within the teachings of the present invention.

Although the nozzle 54 shown in the drawing figures is designed to be axially moveable relative to the tailgate from a nondispensing position, shown in FIG. 5, to a dispensing position, shown in FIG. 6, the nozzle may be fixed relative to the walls of the tailgate.

In the preferred embodiment, a cover 60 is pivotally mounted adjacent the discharge opening so as to be in overlying and closing relationship with the dispensing nozzle whenever the dispensing nozzle is not in use. The cover may be spring loaded such that it is normally urged to a closed position, as shown in FIGS. 1 and 5. The cover for the dispensing nozzle will prevent contamination of the nozzle by dirt, dust, and other debris during use of the vehicle.

When it is desired to dispense liquid from the storage container or tank 30, the cover 60 is moved to an open position, as shown in FIG. 6, and the dispensing valve or nozzle 54 is pulled outwardly so that the spout 55 extends exteriorly of the tailgate. A gasket or o-ring assembly 70 surrounds the shaft of the nozzle and prevents leakage from the storage tank cavity 30 through the discharge opening 52. The discharge nozzle may have a pair spaced flanges 72 and 74 which limit the inner and outer movement of the nozzle with respect to the walls of the tailgate, as shown in FIGS. 5 and 6.

The present invention may also be utilized to provide a source of cool water by providing an inlet opening which is of sufficient size to permit ice to be deposited within the tank.

From the foregoing, a large quantity of potable water may be easily introduced into the dispensing tank defined by the tailgate of the present invention without requiring any storage or passenger space to be consumed.

During the dispensing of liquid from the tank cavity, if the inlet cover is closed, a vacuum may be established above the liquid within the cavity. In order to allow dispensing, the cover may be unlatched to permit air flow. In addition, or as a alternate embodiment, a one way or breather valve for air may be provide through one of the walls of the tailgate. Such a valve is shown at 80 in the upper wall 24 of the tailgate in FIG. 4.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A liquid dispensing apparatus for use with a conventional automotive vehicle, the apparatus comprising;
    a tailgate having front and rear walls, opposite side walls, an upper wall and lower portion defining an interior liquid storage tank therebetween;

means adapted for pivotally mounting said tailgate to an automotive vehicle;

an inlet opening into tank cavity and inlet cover means for selectively covering and closing said inlet opening; and a dispensing nozzle mounted in communication with a discharged opening from said tank whereby liquid may be introduced into said tank through said inlet opening and selectively discharged from said tank through said dispensing nozzle.

2. The liquid dispensing apparatus of claim 1 including discharge cover mounted to said tailgate and being movable from a first position covering said dispensing nozzle to a second position in which said dispensing nozzle is accessible from an exterior surface of said tailgate.

3. The liquid dispensing apparatus of claim 2 including means for admitting air into said tank as liquid is dispensed therefrom through said dispensing nozzle.

4. The liquid dispensing apparatus of claim 2 in which said walls of said tailgate include an outer shell and an inner fluid impervious shell and an insulation layer intermediate said inner and outer shells.

5. The liquid dispensing apparatus of claim 4 including means for selectively latching said inlet cover means in a closed position relative to said inlet opening.

6. The liquid dispensing apparatus of claim 4 including locking means for locking said cover means in said closed position.

7. The fluid dispensing apparatus of claim 4 wherein said outer shell is formed of a metallic material in said inner shell is formed from a biocompatible material selected from a plastic and a metal.

8. The liquid dispensing apparatus of claim 4 wherein said dispensing nozzle is recessed inwardly of said tailgate with respect to one of said walls thereof.

9. The liquid dispensing apparatus of claim 8 wherein said dispensing nozzle is moveable between a nondispensing position recessed from said one of said walls of said tailgate to a dispensing position extending outwardly from said one of said walls of said tailgate.

10. The liquid dispensing apparatus of claim 4 wherein said inlet opening is formed in said upper wall of said tailgate and said outlet opening is adjacent said lower portion thereof.

11. The liquid dispensing apparatus of claim 4 including an air breather valve mounted through one of said walls of said tailgate for allowing admittance of air during dispensing of a liquid from said tank.

\* \* \* \* \*